US012081719B2

United States Patent
Fleureau et al.

(10) Patent No.: US 12,081,719 B2
(45) Date of Patent: Sep. 3, 2024

(54) METHOD AND APPARATUS FOR CODING AND DECODING VOLUMETRIC VIDEO WITH VIEW-DRIVEN SPECULARITY

(71) Applicant: INTERDIGITAL CE PATENT HOLDINGS, SAS, Paris (FR)

(72) Inventors: Julien Fleureau, Rennes (FR); Franck Thudor, Rennes (FR); Thierry Tapie, Rennes (FR); Renaud Dore, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 116 days.

(21) Appl. No.: 17/787,364

(22) PCT Filed: Dec. 17, 2020

(86) PCT No.: PCT/EP2020/086756
§ 371 (c)(1),
(2) Date: Jun. 20, 2022

(87) PCT Pub. No.: WO2021/122983
PCT Pub. Date: Jun. 24, 2021

(65) Prior Publication Data
US 2022/0377302 A1     Nov. 24, 2022

(30) Foreign Application Priority Data
Dec. 20, 2019 (EP) .................................... 19306717

(51) Int. Cl.
*H04N 13/111* (2018.01)
*H04N 13/161* (2018.01)
*H04N 13/178* (2018.01)

(52) U.S. Cl.
CPC ......... *H04N 13/111* (2018.05); *H04N 13/161* (2018.05); *H04N 13/178* (2018.05)

(58) Field of Classification Search
CPC .................................................... H04N 13/111
See application file for complete search history.

(56) References Cited

U.S. PATENT DOCUMENTS 11,122,101 B2 *   9/2021   Fleureau ................ H04N 19/85
11,207,592 B2 *   12/2021   Varanasi ................ G06F 3/011
(Continued)

FOREIGN PATENT DOCUMENTS

EP    3562159 A1    10/2019
GB    2572996 A     10/2019

OTHER PUBLICATIONS

Salahieh et al., "Test Model for Immersive Video", International Organisation for Standardisation, ISO/IEC JTC 1/SC 29/WG 11, Coding of Moving Pictures and Audio, Document: N18470, Geneva, Switzerland, Mar. 2019, 27 pages.
(Continued)

*Primary Examiner* — Irfan Habib
(74) *Attorney, Agent, or Firm* — CONDO ROCCIA KOPTIW LLP

(57) ABSTRACT

Methods and devices are provided for encoding, transmitting and decoding 3DoF+ volumetric video. At the encoding stage one input view (among all the input ones) is selected to convey the viewport dependent light effect and its id is transmitted to the decoder as an extra metadata. On the decoder side, when patches coming from this selected view are available for the rendering of the viewport, they are preferentially used regarding the other candidates whatever the view to synthesize position.

12 Claims, 6 Drawing Sheets

(56) References Cited

U.S. PATENT DOCUMENTS

| | | | | |
|---|---|---|---|---|
| 11,367,247 B2* | 6/2022 | Thudor | | G06T 15/08 |
| 11,483,536 B2* | 10/2022 | Fleureau | | H04N 13/194 |
| 11,616,981 B2* | 3/2023 | Xiu | | H04N 19/119 |
| | | | | 348/36 |
| 11,721,044 B2* | 8/2023 | Fleureau | | G06T 15/20 |
| | | | | 345/419 |
| 11,792,378 B2* | 10/2023 | Boyce | | G06F 3/012 |
| | | | | 345/51 |
| 11,836,882 B2* | 12/2023 | Xu | | H04N 21/6587 |
| 11,968,349 B2* | 4/2024 | Salmon-Legagneur | | |
| | | | | H04N 13/178 |
| 11,979,546 B2* | 5/2024 | Chupeau | | G06T 7/194 |
| 2006/0268987 A1* | 11/2006 | Ha | | H04N 13/111 |
| | | | | 348/42 |
| 2009/0129667 A1* | 5/2009 | Ho | | G06T 15/205 |
| | | | | 382/154 |
| 2010/0195716 A1 | 8/2010 | Klein et al. | | |
| 2011/0142138 A1* | 6/2011 | Tian | | H04N 19/597 |
| | | | | 375/E7.026 |
| 2014/0376635 A1* | 12/2014 | Senoh | | H04N 13/194 |
| | | | | 375/240.16 |
| 2015/0193965 A1* | 7/2015 | Chen | | G06T 5/77 |
| | | | | 345/419 |
| 2020/0084428 A1* | 3/2020 | Oh | | H04N 19/46 |
| 2021/0321081 A1* | 10/2021 | Appelgate | | H04N 13/111 |
| 2022/0078396 A1* | 3/2022 | Gül | | H04L 65/65 |

OTHER PUBLICATIONS

Fleureau et al., "Description of Technicolor Intel Response to MPEG-I 3DoF+ Call for Proposal", International Organization for Standardization, ISO/IEC JTC1/SC29/WG11, Document: MPEG2019/M47445, Geneva, Switzerland, Mar. 2019, 24 pages.

* cited by examiner

| 811 | 812 | 813 | 814 | 815 |
| --- | --- | --- | --- | --- |
| 821 | 822 | 823 | 824 | 825 |
| 831 | 832 | 833 | 834 | 835 |
| 841 | 842 | 843 | 844 | 845 |

METHOD AND APPARATUS FOR CODING AND DECODING VOLUMETRIC VIDEO WITH VIEW-DRIVEN SPECULARITY

CROSS REFERENCE TO RELATED APPLICATIONS

This application is a U.S. National Stage Application under 35 U.S.C. 371 of International Patent Application No. PCT/EP2020/086756, filed Dec. 17, 2020, which is incorporated herein by reference in its entirety.

This application claims the benefit of European Patent Application No. 19306717.0, filed Dec. 20, 2019, which is incorporated herein by reference in its entirety.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (a.k.a. 3DoF+) restricts the user viewing space to a limited volume called viewing bounding box, allowing limited translation of the head and parallax experience. This second context is a valuable trade-off between free navigation and passive viewing conditions of a seated audience member.

3DoF+ contents may be provided as a set of Multi-View+ Depth (MVD) frames. Such contents may come from real captures or can be generated from existing CG contents by the mean of dedicated (possibly photorealistic) rendering. A MVD frame is captured by a set of cameras (structured as a rig of cameras) located at different points of view and capturing the same 3D scene. For example, the rig may structure the set of cameras as an array of cameras or as a 360° acquisition device with cameras pointing in different directions. However, 3DoF+ rendering of a 3D scene provided as a MVD frame may create visual artifacts when the frame comprises a lot of specular/reflective or transparent components. Recover a physically true illumination from a MVD frame is a very complex challenge. Indeed, a set of MVD frames does not directly capture sufficient information to recover a proper light-field. The material properties (Bidirectional Reflectance Distribution Function a.k.a. BRDF) of the objects of the scene as well as the description of the light sources may be only roughly estimated from the set of MVD frames and this process is very complex.

In a 3DoF+ scenario, the end-user is supposed to experience a limited amount of parallax with "small" motions within a constrained viewing space. In such a scenario, it can be empirically shown that a regular viewer is very few sensitive to the variations of specularity/reflection/transparency it could experience when shifting his head position. However, he is very sensitive to the consistency of these light effects over a synthesized view. There is a lack of a solution for encoding, transmitting and decoding volumetric video content provided as a MVD frame sequence with consistent rendering of these light effects.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method for encoding a 3D scene provided as a multiviews-plus-depth (MVD) frame in a data stream. The method comprises:

selecting a view among the MVD frame as a reference view on the basis of a field of view coverage of the 3D scene from an average position in a viewing space;

generating an atlas image packing at least one patch. A patch is an image part of a view of the MVD frame. The atlas image comprises information representative of the 3D scene visible from the viewing space.

generating metadata comprising acquisition parameters of each view of the MVD frame, an information associating each patch with a view, and an identifier of the selected reference view; and encoding the atlas and the metadata in the data stream.

The present principles also relate to a method for decoding a data stream representative of a 3D scene visible from a viewing space. The method comprises:

decoding an atlas image and associated metadata from the data stream, the atlas image is packing at least one patch. A patch is an image part of a view of a multiviews-plus-depth (MVD) frame. The atlas image comprises information representative of the 3D scene visible from the viewing space.

The metadata comprise acquisition parameters of each view of the MVD frame, an information associating each patch with a view, and an identifier of a reference view, a patch associated with the reference view being a reference patch;

rendering a viewport image for a current point of view within the viewing space by:

when two patches contribute to the viewport image, if one of the two patches is a reference patch, use the color contribution of the reference patch for the viewport image The present principles also relate to a device comprising a processor implementing the steps of the encoding method described above and to a device comprising a processor implementing the steps of the decoding method described above.

4. BRIEF DESCRIPTION OF DRAWINGS

The present disclosure will be better understood, and other specific features and advantages will emerge upon reading the following description, the description making reference to the annexed drawings wherein.

Figures 8, 9:
Figure 10:
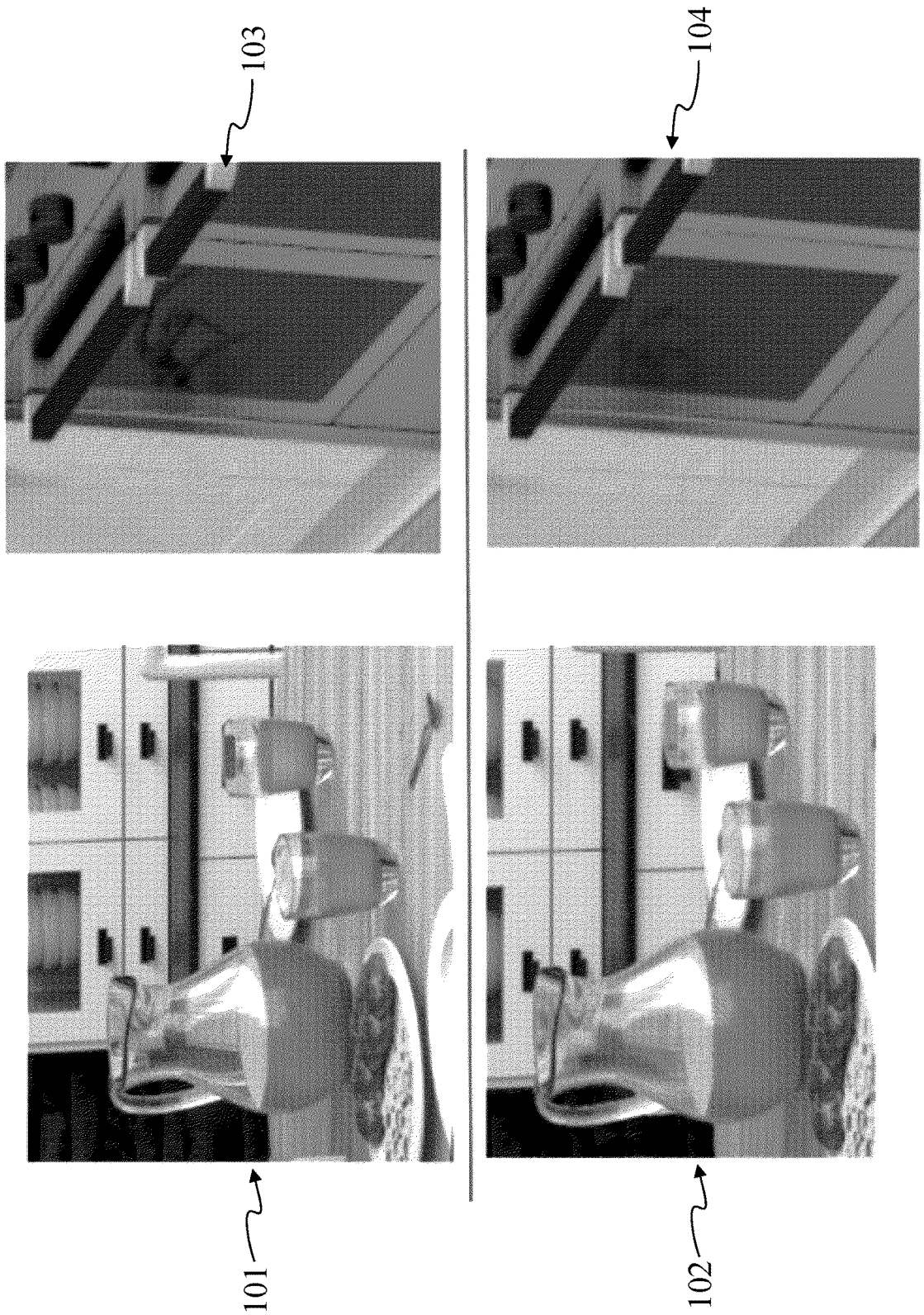
Figure 11:
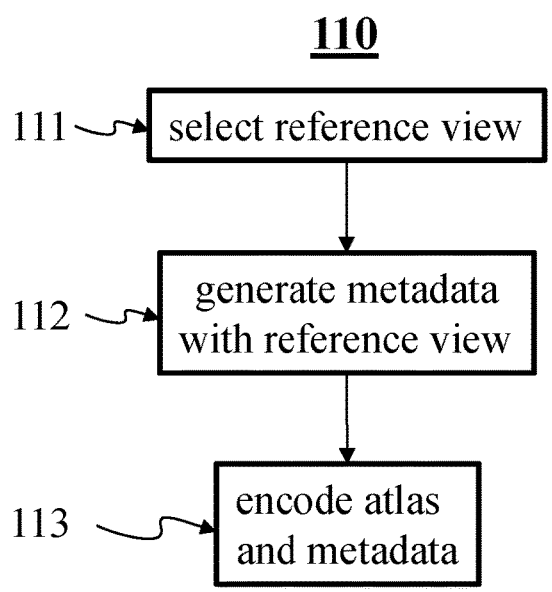
Figure 12:
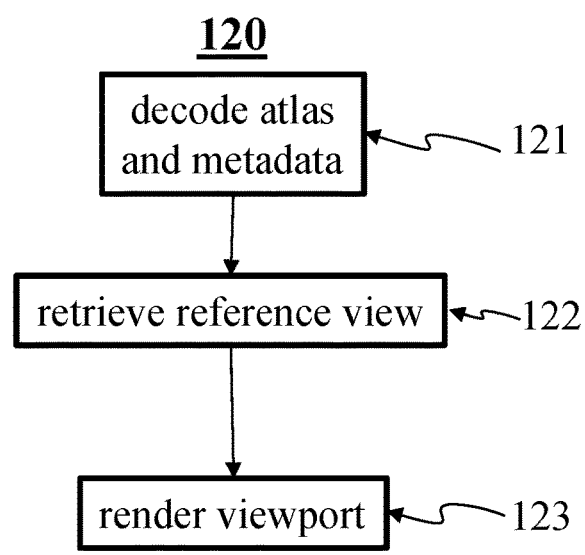

FIG. 8 diagrammatically illustrates a Multi-View+Depth (MVD) frame capture by an array of twenty perspective cameras, according to a non-limiting embodiment of the present principles;

FIG. 9 shows two of the twenty views of a 3D scene captured by the camera array of FIG. 8, according to a non-limiting embodiment of the present principles;

FIG. 10 shows details of a viewport image of the scene of FIG. 9 from a given point of view in the associated 3DoF+ viewing space, according to a non-limiting embodiment of the present principles;

FIG. 11 illustrates a method for encoding a volumetric video content, according to a non-limiting embodiment of the present principles;

FIG. 12 illustrates a method 120 for decoding a volumetric video content, according to a non-limiting embodiment of the present principles.

5. DETAILED DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

Figure 1:
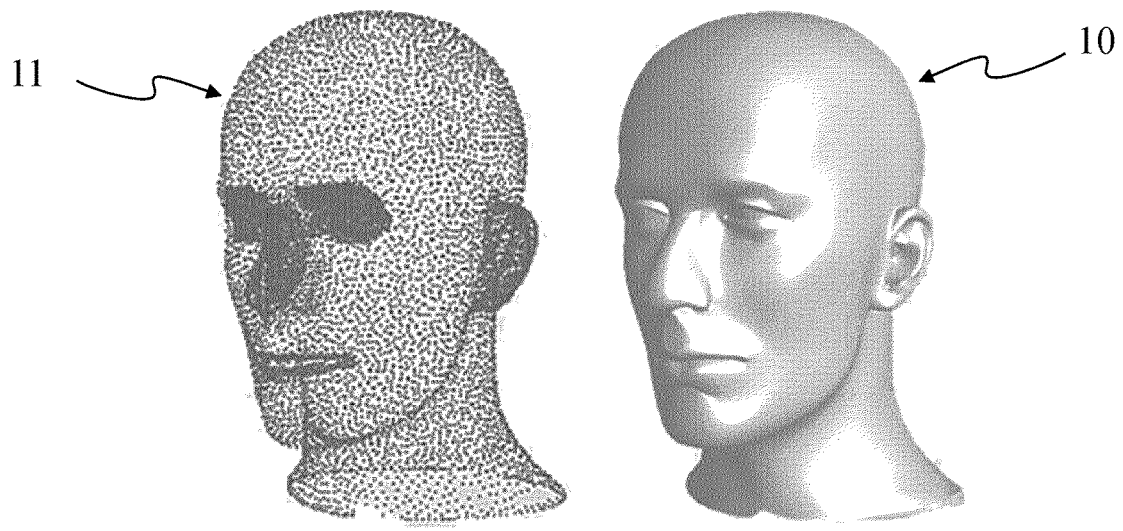
FIG. 1 shows a three-dimension (3D) model of an object and points of a point cloud corresponding to the 3D model, according to a non-limiting embodiment of the present principles.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

Figure 2:
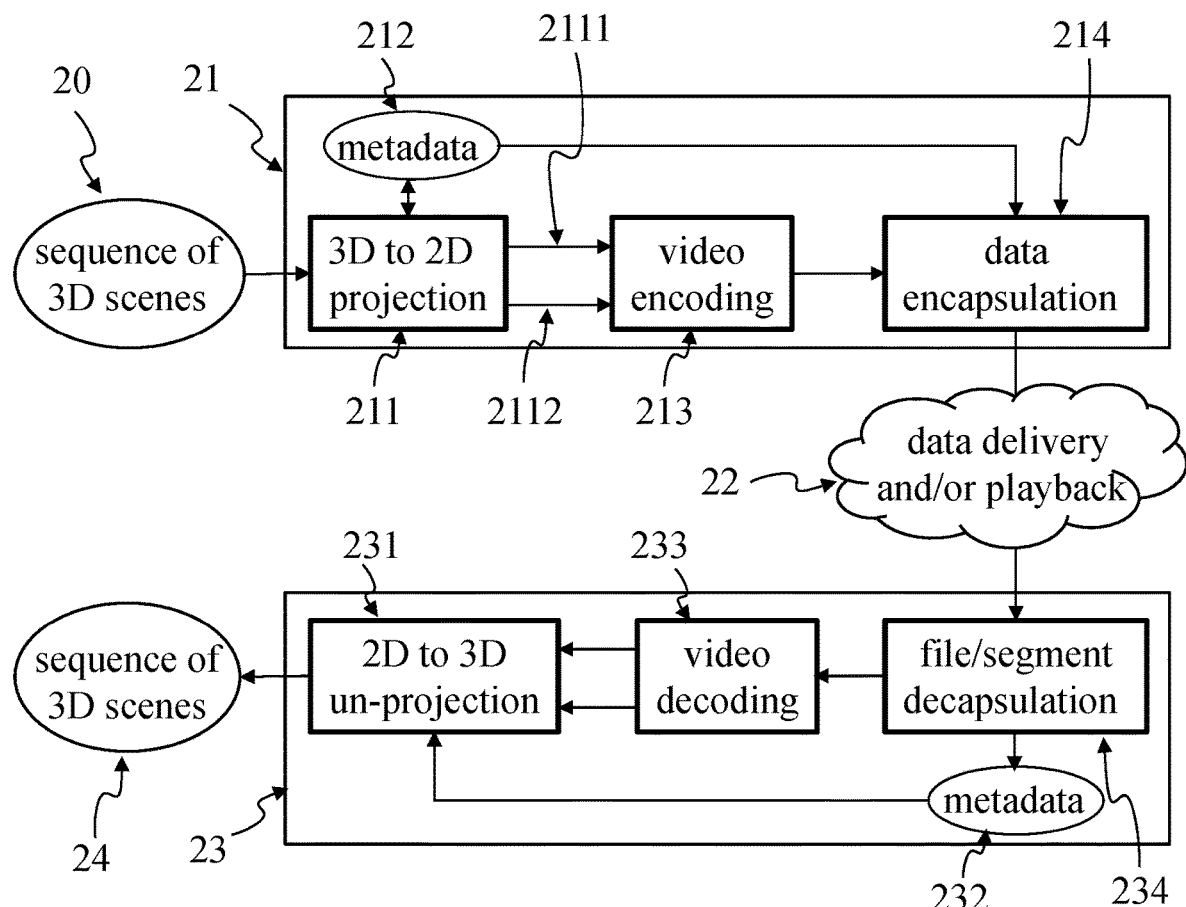
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:

JPEG, specification ISO/CEI 10918-1 UIT-T Recommendation T.81, https://www.itu.int/rec/T-REC-T.81/en;

AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);

3D-HEVC (an extension of HEVC whose specification is found at the ITU website, T recommendation, H series, h265, http://www.itu.int/rec/T-REC-H.265-201612-lien annex G and I);

VP9 developed by Google; or

AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
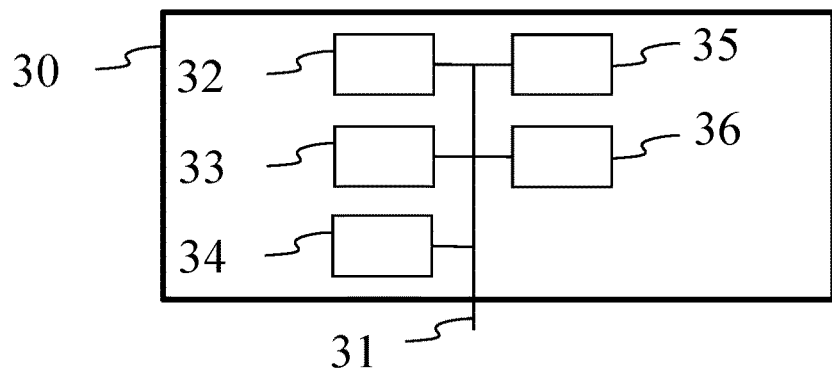
FIG. 3 shows an example architecture of a device which may be configured to implement a method described in relation with FIGS. 11 and 12, according to a non-limiting embodiment of the present principles.

FIG. 3 shows an example architecture of a device 30 which may be configured to implement a method described in relation with FIGS. 11 and 12. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:

- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 11 and 12, and belongs to a set comprising:

- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
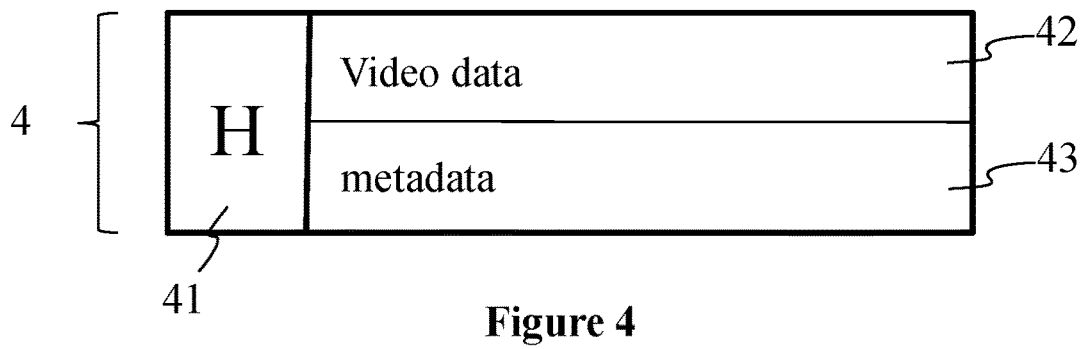
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
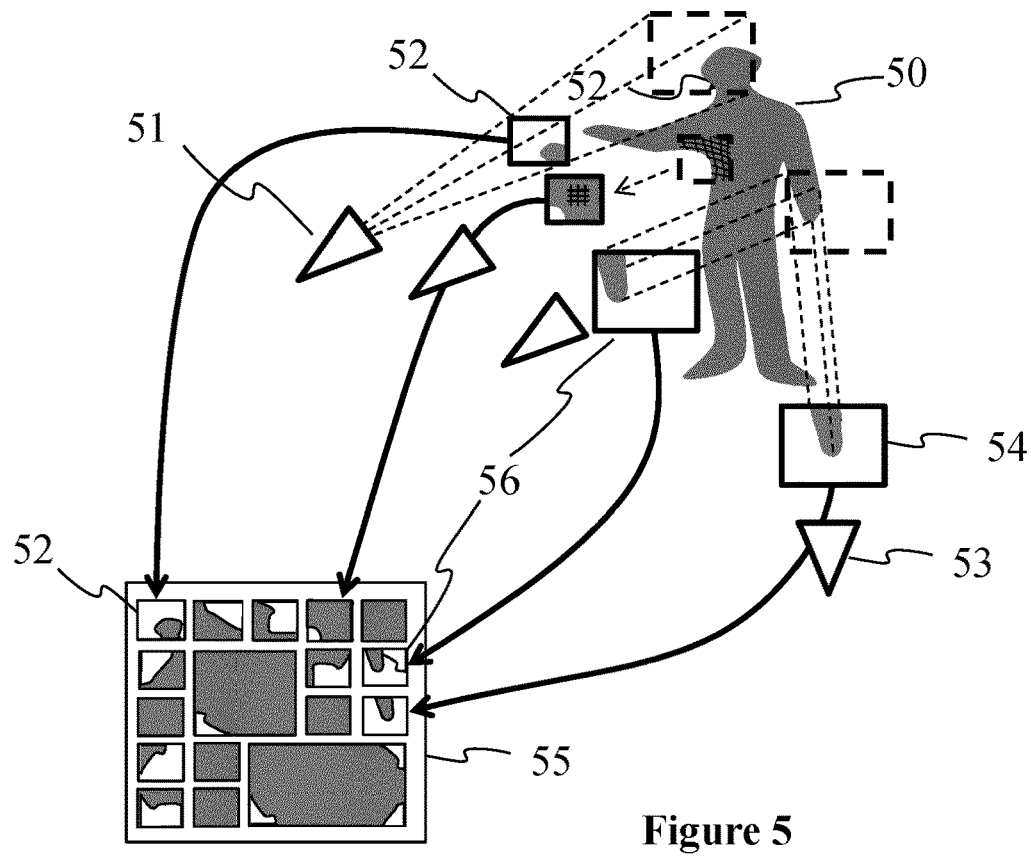
FIG. 5 illustrates a spherical projection from a central point of view, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56. A patch may also be the synthesis of a 4pi steradians central view (equirectangular as in FIGS. 6 and 7 or cube map for instance) which, in most cases, covers ninety percent of the visible part of the 3D scene.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
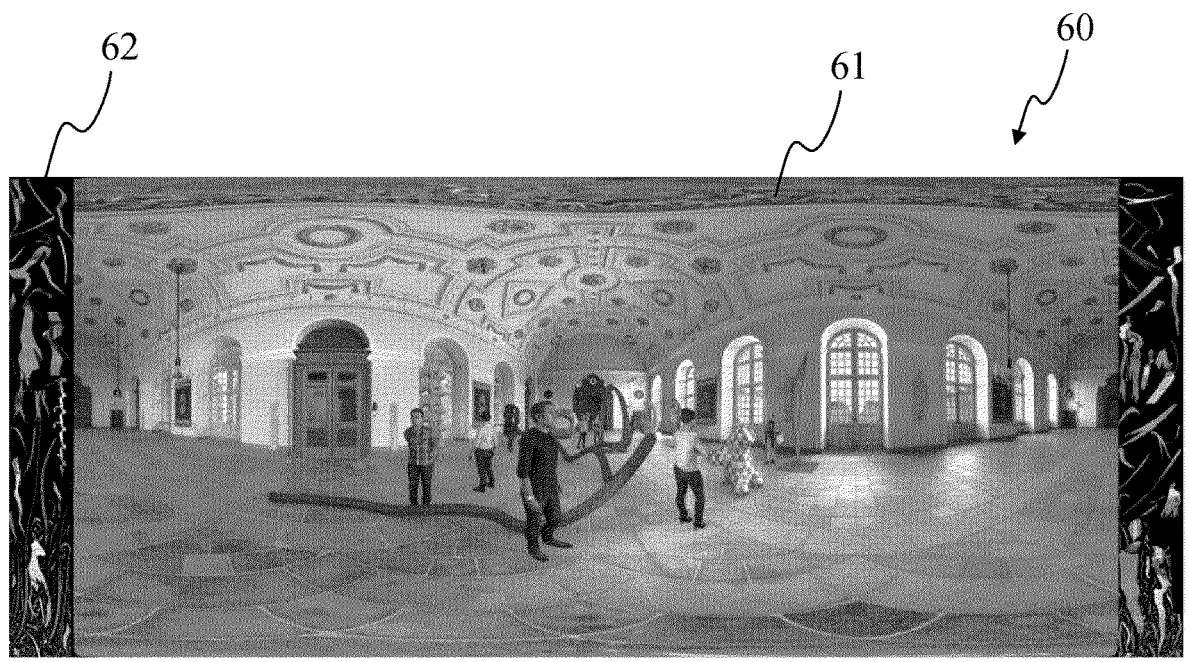
FIG. 6 shows an example of an atlas comprising the texture information of the points of a 3D scene, according to a non-limiting embodiment of the present principles.

FIG. 6 shows an example of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a first part 61 comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the left and right borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 7:
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 72. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

FIG. 8 diagrammatically illustrates a Multi-View+Depth (MVD) frame capture by an array of twenty perspective cameras. In the example of FIG. 8, the twenty (real or virtual) cameras 811 to 845 are organized as an array and aims at the same view direction. The point of view (i.e. the center of projection of the image captured by the camera) are shifted horizontally and/or vertically one from each other. Such a camera rig provides twenty images of a same scene, each view comprising color and potentially depth information. When the views do not comprise a depth component, depth information may be retrieved by processing the views according to the parameters of the cameras.

When the 3D content is provided as a MVD frame, the volumetric information is also conveyed as a combination of color and depth patches stored in corresponding color and depth atlases, as in FIGS. 5 to 7. The video content is encoded making use of regular codecs (e.g. HEVC). Each combination of color and depth patches represents a subpart of the MVD input views and the set of all patches is designed at the encoding stage to "cover" the entire scene while being as less redundant as possible. At the decoding stage, the atlases are first video decoded and the patches are rendered in a view synthesis process to recover the viewport associated with a desired viewing position. The way the patches are created is to be sufficiently non-redundant and complementary is key. A way to do consists in pruning the input source views (or any other synthetic view obtained from the input source views such as the central view of FIGS. 6 and 7) to remove any redundant information. To do so, each input view (color+depth), original or synthesized, is iteratively pruned one after the other. More precisely, a set of unpruned "basic" views is first chosen among the source views and is fully transmitted. The set of remaining "additional" views is then iteratively processed to remove any redundant information (in terms of color and depth similarity) with the "basic views" and any other already pruned "additional" view. Some overlapping between pruned region may be however conserved on purpose to avoid any stitching artifact.

FIG. 9 shows two of the twenty views of a 3D scene captured by the camera array of FIG. 8. For the sake of clarity, only view 811 and view 835 are shown. Image 811 is a view of the scene from upper and more at left than image 835. The 3D scene comprises transparent objects 92 and reflective objects 91 (the oven door reflects the giant spider on the floor). Views 811 and 835 comprise information corresponding to the same points of the 3D scene. However, because of the lighting of the scene and the different acquisition positions, the color information associated with these points may be different from one view to another one. Views 811 also comprise information on points of the 3D scene which are not visible from the point of view of view 835 and reciprocally.

As described above, at least one atlas is generated to encode the 3D scene from the MVD frame by pruning redundant information and conserving some overlapping between pruned regions of the 3D space to help the stitching at the rendering. The atlas is supposed to be sufficient to reconstruct/synthesize any viewport image from any point of view within the 3DoF+ viewing space where the user may move. To do so, a synthesis process is performed which stitches all the patches from the atlas to recover the desired viewport image. However, this stitching step may be subject to strong artifacts when the scene represented in the atlas comprises specular/reflective or transparent components as illustrated in FIG. 9. Such light effects depend on the viewing position and thus, the perceived color of the concerned spatial parts may change from one viewpoint to the other. The set of MVD source frames used to capture the volumetric scene is therefore affected by such changes and so, the atlas patches (which have been extracted or synthesized from this set of MVD frames). Different patches related to overlapping regions of the 3D space may have different colors. However, mixing patches coming from different views may end up with a heterogeneous patchwork not compatible with a proper visualization of the volumetric scene.

When overlapping between patches occurs, different strategies may be envisioned to mitigate this issue. A first approach consists in selecting the patch coming from the closest view from the current view to synthesize. Despite its simplicity, this approach may cause important temporal artifacts when one synthesizes views from a moving virtual camera. Indeed, in the example case of two patches extracted from two views with associated viewing position P1 and P2 and representing the same part of the space, when the virtual camera center O is moving and is crossing the isodistance (OP1=OP2) frontier, the synthesizer suddenly switches from one patch to the other which causes so-called "clicking artifacts". These artifacts are even more disturbing if the moving camera is frequently crossing the isodistance frontier. A second approach consists in weighting the contribution of each patch instead of selecting one of them. The weight may be for instance derived from the distances OP1 and OP2. This approach avoids "clicking" artifacts, but the final synthesis is blurred because the contribution of each patch is averaged. Nevertheless, these two approaches are not suitable where patches do not overlap.

FIG. 10 shows details of a viewport image of the scene of FIG. 9 from a given point of view in the associated 3DoF+ viewing space. Images 101 and 103 are details of the viewport image when generated using the present principles. Images 102 and 104 are same details of the same viewport image when generated using the weighting approach (called second approach above). On image 102, the jug and the glasses are less transparent than on image 101 and the reflection of the spider in the oven glass is less sharp on image 104 than on image 103 because of the combination and/or the averaging of different patches coming from significantly different viewpoints.

According to the present principles, at the encoding stage, one source view (or a restricted subset of source views) is selected as the reference view and is considered at the decoding stage as conveying the lighting information. The patches associated to this reference view are selected at the decoding stage as the (preferred) rendering color as soon as the patch is used for the generation of the viewport image from the current viewing position.

The reference view is selected among the views as the view which better covers the volumetric scene in terms of field of view from an average position of the end-user within the 3DoF+ viewing space. Ensuring this latter condition reduces the possible clicking/patchwork effects which occurs when the selected view does not cover the user viewport anymore (because of occlusions or too small field of view). For instance, the reference view is selected among the views of the source MVD frame as the one having a most central position (closest from the barycenter of all the input views optical center). On the example of FIG. 8, view 823 or view 833 (or both or a view synthetized from both of them) is selected as the reference view. In a variant, the synthesis of a 4pi steradians central view (like in FIGS. 6 and 7) is enforced as the encoding stage and this central view is selected as the reference view (with only one associated patch).

The reference view has to be signaled to the decoder so that this latter may be able to use it properly at the rendering stage. This information may be indicated in the metadata at the camera parameters' description level with an additional optional Boolean array specular_confidence (available if and only if a specular_confidence_params_equal_flag is set to true) where each component is true if the associated input view/camera should be used as a reference for the shading, as proposed in the following table:

| | Descr |
|---|---|
| camera_params_list( ) { | |
|   num_cameras_minus1 | u(16) |
|   for ( i= 0; i <= num_cameras_minus1; i++) { | |
|     cam_pos_x[ i ] | u(32) |
|     cam_pos_y[ i ] | u(32) |
|     cam_pos_z[ i ] | u(32) |
|     cam_yaw[ i ] | u(32) |
|     cam_pitch[ i ] | u(32) |
|     cam_roll[ i ] | u(32) |
|   } | |
|   intrinsic_params_equal_flag | u(1) |
|   for ( i = 0; i <= intrinsic_params_equal_flag ? 0 : num_ cameras_minus1; i++ ) | |
|     camera_intrinsics( [ i ] ) | |
|   depth_quantization_params_equal_flag | u(1) |
|   for ( i = 0; i <= depth_quantization_equal_flag ? 0 : num_cameras_minus1; i++ ) | |
|     depth_quantization( [ i ] ) | |
|   specular_confidence_params_equal_flag | u(1) |
|   for ( i = 0; i <= specular_confidence_params_equal_flag ? 0 : num_ cameras_minus1; i++ ) | |
|     specular_confidence[ i ] | u(1) |

In the case of the use of one unique view, the use of a single 32-bits unsigned integer field specular_confidence id designating the reference view could be alternatively considered. A specific value (0xffffffff or num_cameras_minus1+1 for instance) could be also chosen to disable the feature, as shown in the following table:

| | Descr. |
|---|---|
| camera_params_list( ) { | |
|   num_cameras_minus1 | u(16) |
|   for ( i= 0; i <= num_cameras_minus1; i++) { | |
|     cam_pos_x[ i ] | u(32) |
|     cam_pos_y[ i ] | u(32) |
|     cam_pos_z[ i ] | u(32) |
|     cam_yaw[ i ] | u(32) |
|     cam_pitch[ i ] | u(32) |
|     cam_roll[ i ] | u(32) |
|   } | |
|   intrinsic_params_equal_flag | u(1) |
|   for ( i = 0; i <= intrinsic_params_equal_flag ? 0 : num_ cameras_minus1; i++ ) | |
|     camera_intrinsics( [ i ] ) | |
|   depth_quantization_params_equal_flag | u(1) |
|   for ( i = 0; i <= depth_quantization_equal_flag ? 0 : num_cameras_minus1; i++ ) | |
|     depth_quantization( [ i ] ) | |
|   specular_confidence_id | u(32) |

At the decoding stage, the (set of) reference camera/view id(s) for the shading (lighting effects) is (are) recovered. Each patch associated with this (these) reference camera(s) is (are) used preferentially each time it (they) cover the viewport to synthesize. Doing so, the light effects are baked and do not change whatever the viewing position as expected.

FIG. 11 illustrates a method 110 for encoding a volumetric video content, according to a non-limiting embodiment of the present principles. In a step 111, a 3D scene to encode is obtained from a source. The 3D scene is provided as a multiviews-plus-depth content, for instance a MVD frame, captured by different cameras, each camera having its own extrinsic and intrinsic parameters. According to the present principles, a view (or a restricted subset of source views) is selected as the reference view. The reference view is selected among the views as the view which better covers the volumetric scene in terms of field of view from an average position of the end-user within the 3DoF+ viewing space. The views are used to generate a set of patches which may be packed in an atlas image, a patch being an image extracted from one view. At a step 112, metadata are generated and associated with the patches and/or with the atlas. Generated metadata comprise information describing extrinsic and intrinsic parameters of cameras (i.e. parameters related to each view) and associating each patch with the view it is extracted from. According to the present principles, the metadata comprise an information indicating the reference view selected at step 111. At a step 113 the volumetric scene is encoded in a data stream, the data stream comprising data representative of the patch atlas and associated metadata. The method applies on sequence of MVD content to encode a volumetric video.

FIG. 12 illustrates a method 120 for decoding a volumetric video content, according to a non-limiting embodiment of the present principles. At a step 121, a data stream representative of a volumetric scene is obtained from a source. The data stream is decoded to retrieve an atlas image which comprises at least one patch image, a patch being an image extracted from a view on the 3D scene. The atlas image is associated in the data stream with metadata comprising information describing extrinsic and intrinsic parameters of cameras (i.e. parameters related to each view) and associating each patch with the view it is extracted from. At a step 122, the id of a reference view is retrieved from the metadata. A patch associated with the reference view is a reference patch. At a step 123, a viewport image is generated for a current point of view of the user within the 3DoF+ viewing space of the 3D scene. Color component of pixels of the viewport image are picked in pixels of patches as a function of the current point of view and the parameters of each view and patch. When two patches associated with different views may contribute for the color component of a pixel of the viewport image, if one of these two patches is associated with the reference view, the color provided by this reference patch is attributed to the pixel of the viewport. Otherwise, a combination of the two colors (or a selection of one of them) is used for the pixel of the viewport.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a 3D scene in a data stream, the 3D scene being provided as a Multi-view plus Depth frame, the method comprising:
    selecting a view from the Multi-view plus Depth frame as a reference view based on a field of view coverage of the 3D scene from an average position in a viewing bounding box in the 3D scene;
    generating an atlas image, the atlas image packing patches, a patch being an image part of a view of the Multi-view plus Depth frame, the atlas image comprising information representative of the 3D scene visible from the viewing bounding box;
    generating metadata comprising information associating each patch with a view, and an identifier of the selected reference view; and
    encoding the atlas and the metadata in the data stream.

2. The method of claim 1, wherein the patches are obtained by pruning redundant information between views and conserving overlapping pixels between patches.

3. The method of claim 1, wherein the reference view is packed in the atlas as an unpruned patch.

4. A non-transitory computer readable storage medium having stored thereon instructions for causing one or more processors to implement the method of claim 1.

5. A method for rendering a viewport image representative of a 3D scene visible from a viewing bounding box in the 3D scene, the method comprising:
    decoding an atlas image and associated metadata from a data stream, the atlas image packing patches, a patch being an image part of a view of a Multi-view plus Depth frame, the atlas image comprising information representative of the 3D scene visible from the viewing bounding box, and the metadata comprising information associating each patch with a view, and an identifier of a reference view, a patch associated with the reference view being a reference patch; and
    when two patches contribute to the viewport image, rendering the viewport image for a current point of view within the viewing bounding box if one of the two patches is a reference patch, using only the contribution of the reference patch for the viewport image.

6. The method of claim 5, wherein the reference view is one of the patches of the atlas.

7. A device for encoding a 3D scene in a data stream, the 3D scene being provided as a Multi-views plus Depth frame, the device comprising a processor configured for:
    selecting a view from the Multi-view plus Depth frame as a reference view based on a field of view coverage of the 3D scene from an average position in a viewing bounding box in the 3D scene;
    generating an atlas image, the atlas image packing patches, a patch being an image part of a view of the Multi-view plus Depth frame, the atlas image comprising information representative of the 3D scene visible from the viewing bounding box;
    generating metadata comprising information associating each patch with a view, and an identifier of the selected reference view; and
    encoding the atlas and the metadata in the data stream.

8. The device of claim 7, wherein the patches are obtained by pruning redundant information between views and conserving overlapping pixels between patches.

9. The device of claim 7, wherein the reference view is packed in the atlas as an unpruned patch.

10. A device for rendering a viewport image representative of a 3D scene visible from a viewing bounding box in the 3D scene, the device comprising a processor configured for:
- decoding an atlas image and associated metadata from the data stream, the atlas image packing patches, a patch being an image part of a view of a Multi-view plus Depth frame, the atlas image comprising information representative of the 3D scene visible from the viewing bounding box, and the metadata comprising information associating each patch with a view, and an identifier of a reference view, a patch associated with the reference view being a reference patch; and
- rendering the viewport image for a current point of view within the viewing bounding box by:
  - when two patches contribute to the viewport image, if one of the two patches is a reference patch, using only the contribution of the reference patch for the viewport image.

11. The device of claim 10, wherein the reference view is one of the patches of the atlas.

12. A non-transitory computer readable storage medium having stored thereon instructions for causing one or more processors to implement the method of claim 5.

* * * * *